(12) United States Patent  (10) Patent No.: US 8,683,933 B1
Portela  (45) Date of Patent: Apr. 1, 2014

(54) SOLID ROCKET BRAKING SYSTEM

(71) Applicant: Mario Placido Portela, Miami, FL (US)

(72) Inventor: Mario Placido Portela, Miami, FL (US)

(*) Notice: Subject to any disclaimer, the term of this patent is extended or adjusted under 35 U.S.C. 154(b) by 0 days.

(21) Appl. No.: 13/726,138

(22) Filed: Dec. 23, 2012

Related U.S. Application Data (60) Provisional application No. 61/591,981, filed on Jan. 29, 2012.

(51) Int. Cl.
*B63C 7/00* (2006.01)

(52) U.S. Cl.
USPC ............ 114/44; 60/219; 60/253; 60/256; 114/50

(58) Field of Classification Search
USPC ............ 114/50; 60/219, 250, 251, 253, 254, 60/255, 256, 257, 258, 770, 771
See application file for complete search history.

(56) References Cited

U.S. PATENT DOCUMENTS

| | | |
|---|---|---|
| 2,395,435 A | 2/1946 | Thompson et al. |
| 4,676,457 A | 6/1987 | Allen |
| 5,601,256 A | 2/1997 | Harris |
| 6,905,561 B2 | 6/2005 | Jones et al. |
| 7,022,196 B2 | 4/2006 | Cesaroni et al. |
| 7,229,029 B2 * | 6/2007 | Windham ............ 440/38 |
| 7,685,940 B1 | 3/2010 | Cavalleri et al. |
| 8,051,640 B2 | 11/2011 | Geisler et al. |
| 2002/0029829 A1 | 3/2002 | Jones et al. |
| 2002/0157557 A1 | 10/2002 | Cesaroni et al. |
| 2009/0320443 A1 | 12/2009 | Geisler et al. |

* cited by examiner

*Primary Examiner* — Lars A Olson
(74) *Attorney, Agent, or Firm* — KB Patents; Luca D'Ottone (57) ABSTRACT

The Device object of the present invention is a solid rocket motor integrated into a propulsion system. The system is designed to be effective for most type of transportation including airplanes, submarines, trains, and ships, such as oil tankers. It is emphasized that this abstract is provided to comply with the rules requiring an abstract that will allow a searcher or other reader to quickly ascertain the subject matter of the technical disclosure.

12 Claims, 8 Drawing Sheets

SOLID ROCKET BRAKING SYSTEM

CLAIM OF PRIORITY FROM RELATED APPLICATIONS

The present application claims priority from U.S. Provisional Patent Application No. 61/591,981 filed on Jan. 29, 2011 to Mari Placido Portela, of Miami (Fla.) directed to a SOLID ROCKT MOTOR, that is hereby incorporated by reference.

STATEMENT REGARDING FEDERALLY SPONSORED RESEARCH OR DEVELOPMENT

The inventor formally declares that did not enjoy the assistance of any federally related grant, loan, or other form of sponsorship in the development of the SOLID ROCKET MOTOR.

BACKGROUND OF THE INVENTION

1. Field of the Invention

This invention generally relates to propeller systems and specifically to propeller systems powered by a solid rocket.

2. Brief Description of the Prior Art

Braking system based on rockets are well known in the art. Various Patents and Published Patent applications are in fact directed to rocket propelled braking systems. While developing the invention of the instant application independently the Inventor researched extensively the public record as well as the current market for spittoons and the most relevant examples found in the search are mentioned in the Information Disclosure Statement (IDS) attached.

Despite all the efforts listed above prior art patents describe structures that are either not truly convenient or else involve complicated, expensive, and overly difficult assembly and/or disassembly parts and procedures. These shortfalls make that no device currently know or previously disclosed utilizes rockets propelled with solid fuel to stop a vehicle either card, wagon, ship, or airplanes. Other devices have been advertised on various media but never patented or described into a printed publication.

SUMMARY OF THE INVENTION

The device of the present application is Solid Rocket Propulsion (Propeller) System that can be activated on command in emergency situations. It is a fact that currently there is no safe and efficient way of stopping a big vessel when in a situation of an imminent accident and even modern warships are at the mercy of torpedoes because of the slow motion in changing their course, and their inability to take a swift turn.

It is then the principal object of the present invention is to provide an emergency maneuvering system, including the break functionality, for large vessels, railroad carriages and aircrafts.

It is a secondary objective of the present invention is to provide for an emergency propulsion system that can lift submarines only, when stuck in a situation of stall. The lift action of the rockets only to be applied to submarines, because of their equilibrium in weight under the water, and to be used only to bring up the craft to the surface for the crew to abandon ship.

It is an additional objective of the present invention to provide a device that does not rust, or deteriorates in the extreme conditions found on planet Earth: ranging from the depth of the abysses to the upper layers of the stratosphere. It is a final objective of the present invention to provide for a device that is cheap to build, but that can eventually be sold at a premium.

These and other objective achieved by the device of the present invention will be apparent by the drawings, by their detailed description, and by the specification here from appended.

DESCRIPTION OF THE PREFERRED EMBODIMENT

As shown in the drawings the device of the present application consist in an emergency solid rocket propeller system designed to be integrated to various vehicles to respond in emergency situation. The use of solid fuel like the high-energy, minimum signature propellant, has already been tested in tactical rocket motors. This type of solid propellant is non-polluting, acid free, solid particulates free, and lead free. It is also smoke free and of course, remains prepared for a long period of time, ready to be activated on short notice. There are some other solid fuels, less expensive, using always a powdered oxidizer (ammonium nitrate or ammonium perchlorate) and a powdered metal fuel (magnesium or aluminum).

In a first preferred embodiment of the device of the present application the system is used to dissipate kinetic energy from a body in motion, such as an airplane or a train card. In a second preferred embodiment of the present invention the solid rocket system is designed to act as a support for a sinking structure, such as a submarine.

A solid rocket or a solid-fuel rocket is a rocket with a motor that uses solid propellants. The propellant utilized in the rocket motors disclosed in the present application may be simple in composition, being comprised of two main constituents—fuel and an oxidizer. Such is the case with the "sugar" based propellants. Experimental composite propellants, on the other hand, may have a composition that is fairly complex, and may contain oxidizer of various mesh sizes, polymer binder, and even metals such as aluminum or magnesium. Curing agents, phase stabilizers, and solvents may be other additives included in small percentages.

Figure 1:
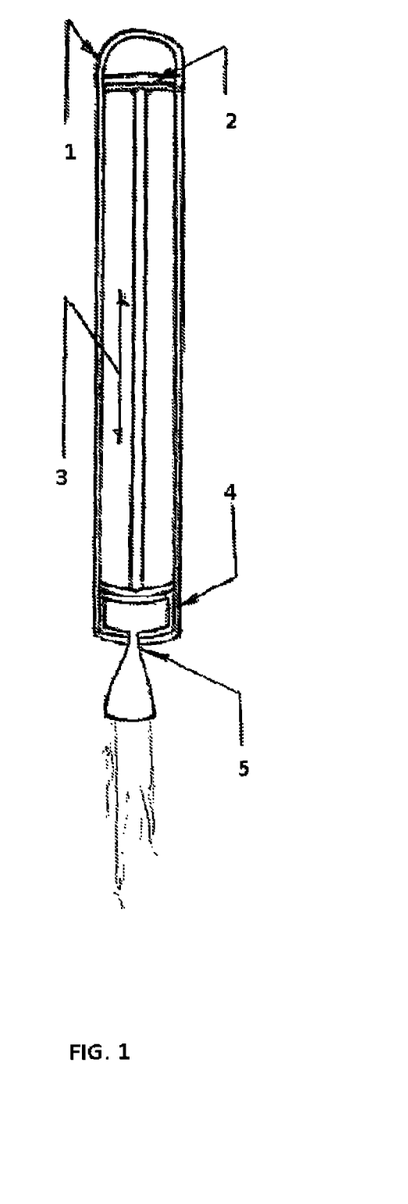
FIG. 1 is a cross sectional elevation view of the solid rocket propeller system of the present invention with all its features, namely a casing (1), an ignition chamber (2), containing a grain (3), a seal (4), and a nozzle (5).
Figure 2:
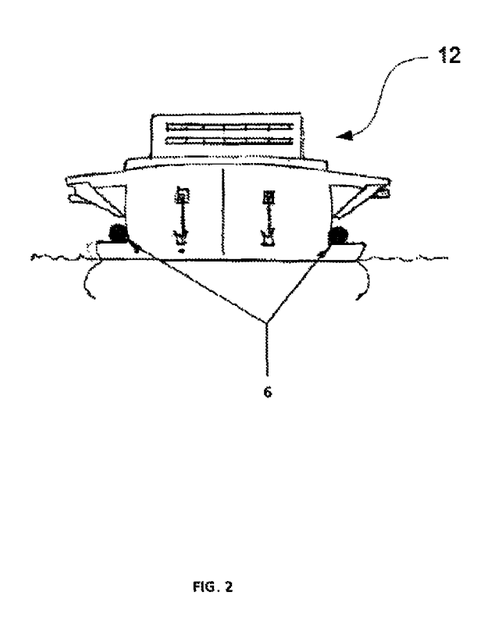
FIG. 2 is a front elevation view of a vessel with the solid rocket propellers of FIG. 1 (6) mounted on its sides, as shown by the arrows, with the nozzles (11) pointed toward the front of the vessels (12), represented in solid black.
Figure 3:
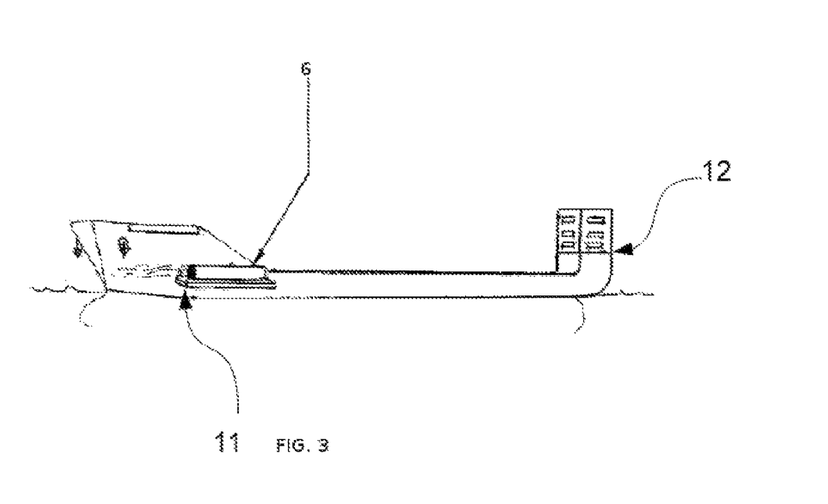
FIG. 3 is a side elevation view of the vessel of FIG. 1, with the solid rocket propellers of FIG. 1 mounted on its sides, as shown by the arrows, with the nozzles (11) pointed toward the front of the vessels (12), ready to be used as brakes.
Figure 4:
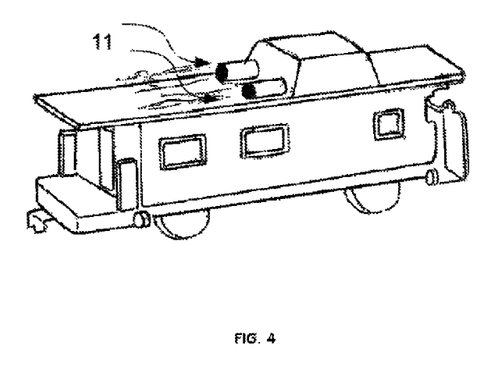
FIG. 4 is a front perspective view of a train card with the solid rocket propellers of FIG. 1 mounted on its top, to be used as emergencies brakes with the nozzles (11) pointed toward the marching direction of the card, represented in solid black.
Figure 5:
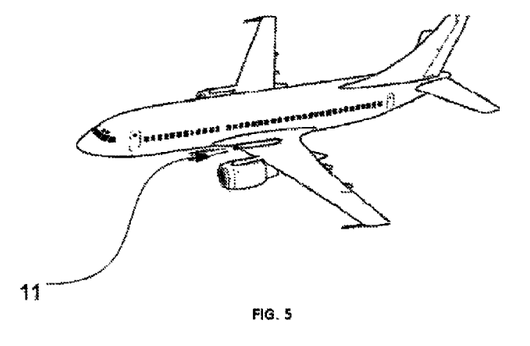
FIG. 5 is a front perspective view of an airplane with the solid rocket propellers of FIG. 1 mounted on the top of its wings, to be used only in emergency landings as brakes with the nozzles (11) pointed toward the front of the plane, represented in solid black.
Figure 6:
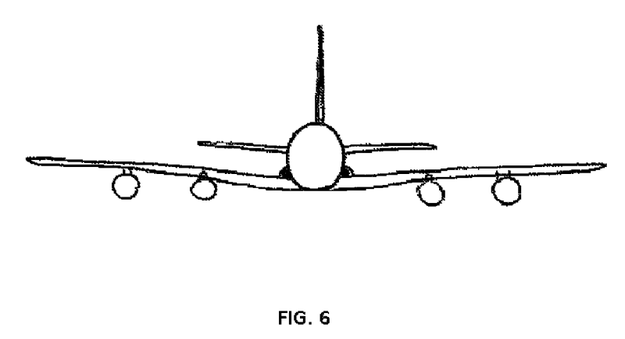
FIG. 6 is a front elevation view of the airplane of FIG. 5.

For any propellant, additives may control the burn-rate, either to accelerate or to slow the rate. An opacifier may be added to absorb heat that may otherwise be transmitted through a translucent grain resulting in unpredictable burning. Regardless of the composition, however, all propellants are processed into a similar basic geometric form, referred to as a propellant grain. As a rule, propellant grains are cylindrical in shape to fit neatly into a rocket motor in order to maximize volumetric efficiency. The grain may consist of a single cylindrical segment (FIG. 1), or may contain many segments. Usually, a central core that extends the full length of the grain is introduced, in order to increase the propellant surface area initially exposed to combustion.

As shown in the drawings essential components of the rocket motor of the present application consists of a casing, nozzle, grain, and an igniter (8). The grain behaves like a solid mass, burning in a predictable fashion and producing exhaust gases. The nozzle dimensions are calculated to maintain a design chamber pressure, while producing thrust from the exhaust gases.

Once ignited, a simple solid rocket motor cannot be shut off, because it contains all the ingredients necessary for combustion within the chamber in which they are burned. More advanced solid rocket motors can not only be throttled but also be extinguished and then re-ignited by controlling the nozzle geometry or through the use of vent ports.

In addition to that the device of the present application teaches a steerable nozzle for guidance, electronics, controllable motors, controllable divert and attitude control motors, and thermal management materials.

In a separate preferred embodiment of the present application a de Laval nozzle is used to maximize the thrust power. A de Laval nozzle (or convergent-divergent nozzle, CD nozzle or con-di nozzle) is a tube that is pinched in the middle, making a carefully balanced, asymmetric hourglass-shape. It is used to accelerate a hot, pressurized gas passing through it to a supersonic speed, and upon expansion, to shape the exhaust flow so that the heat energy propelling the flow is maximally converted into directed kinetic energy. Because of this, the nozzle is widely used in some types of steam turbines, and is used as a rocket engine nozzle. It also sees use in supersonic jet engines.

Figure 8:
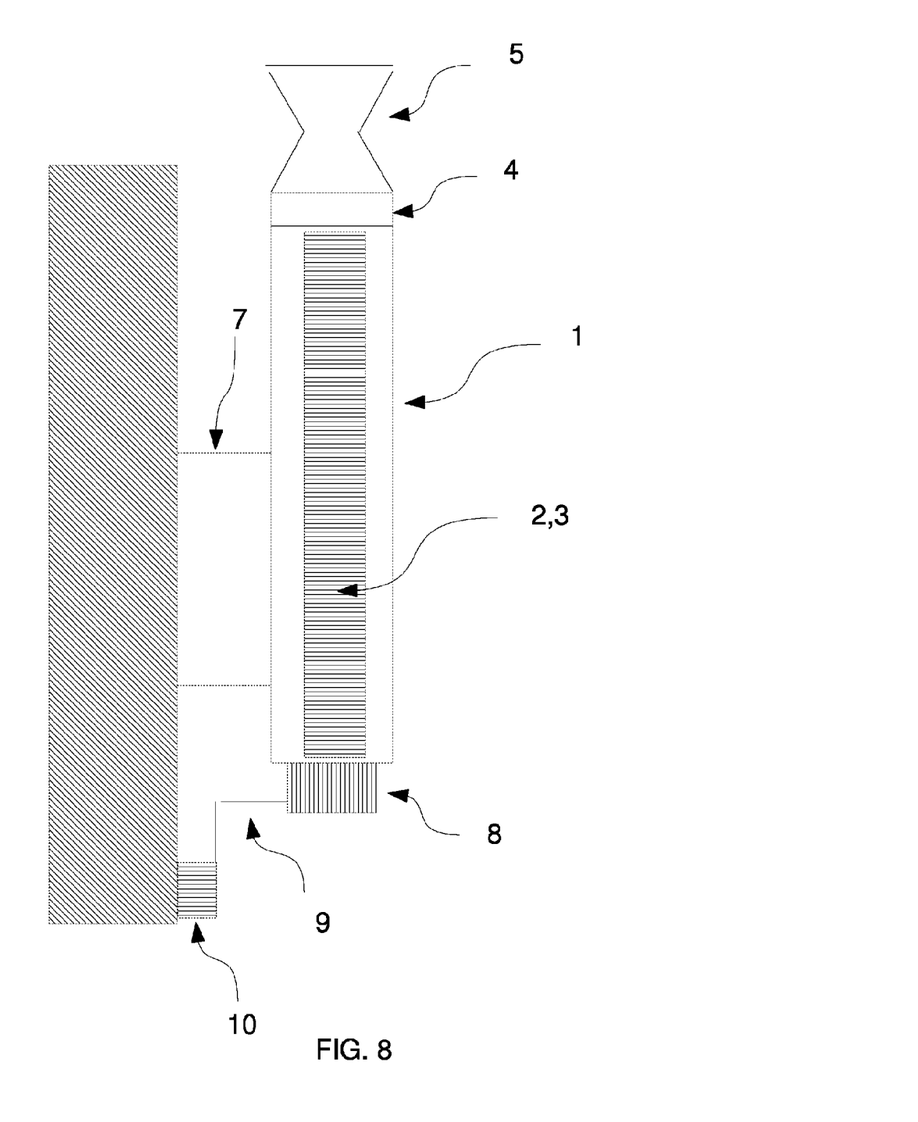
FIG. 8 is a schematic view of the solid fuel rocket based breaking system object of the present application.

In one of its preferred embodiments the solid fuel rocket based breaking system of the present invention comprises a casing (1) mounted on a connector element (7) in a way that the thrust of the rocket pushes in a direction that is the opposite of the regular way of motion of a carriage or wagon; said casing containing an ignition chamber (2) including a grain (3), consisting of an oxidizer and a fuel material (not differentiated in the drawings). The grain being in contact with an igniter (8) electrically connected with an activator (10) via an electrical circuitry (9), where both said grain and said igniter are sealed inside said casing by a seal (4), and a CD nozzle (5) that may be steerable.

Due to the critical thrust born by this braking system the metal connector may be an entire structure dedicated to link the rocket to the wagon or ship, or helicopter. Metal connectors include metal fasteners that can be divided into two kinds-those producing a permanent bond and those requiring either a releasable or a sliding bond. Screws, nuts and bolts, rivets, retaining rings and clamps are examples from the first category. Non-permanent fasteners include quick-release couplers and clamps intended for removal at a specified time and pins, which allow relative movement of fastened parts.

Figure 7:
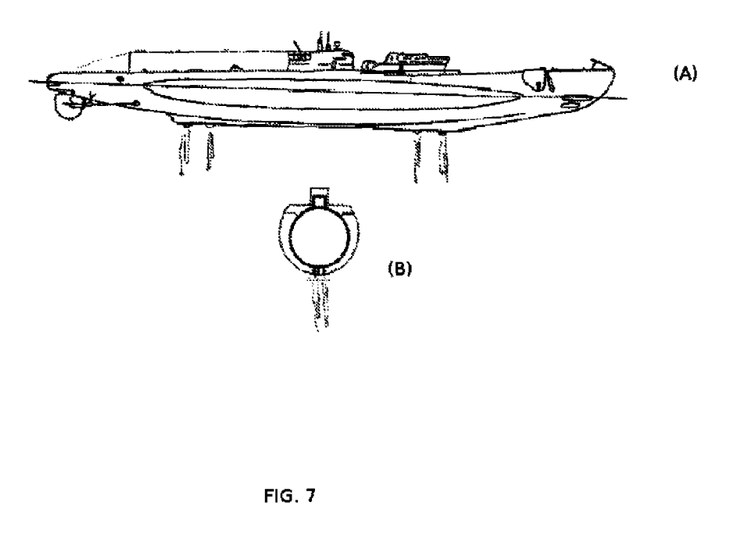
FIG. 7 shows both a front (B) and a side (A) elevation view of a submarine equipped with the solid rocket propellers of FIG. 1 mounted on its bottom, to be used as emergencies propellers with the nozzles pointed toward the bottom, represented in solid black.

As shown in FIGS. 7 (A) and (B) under the teachings of the present invention the solid-fuel rocket technology can also be applied as emergency floating system for submarines. In this case the casing is comprised in within the hull of the submarine and a separate connecting structure is not needed.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

I claim:

1. A solid fuel propelled rocket based braking apparatus comprising a casing mounted on a connector element with nozzles pointed toward the front of a vessel in a way that to dissipate kinetic energy from a vessel in motion; said casing containing a grain, consisting of an oxidizer and a fuel material, said grain being in contact with an igniter electrically connected with an activator via an electrical circuitry, where both said grain and said igniter are sealed inside said casing by a seal, and a steerable CD nozzle.

2. The solid fuel propelled rocket based braking apparatus of claim 1 where said connector is a permanent structure.

3. The solid fuel propelled rocket based braking apparatus of claim 1 where said connector is a releasable clamp.

4. The solid fuel propelled rocket based braking apparatus of claim 1 where said connector is a metal connector.

5. The solid fuel propelled rocket based braking apparatus of claim 1 where said steerable CD nozzle is a tube that is pinched in the middle of asymmetric hourglass-shape.

6. The solid fuel propelled rocket based braking apparatus of claim 1 where said grain consists of a single cylindrical segment.

7. The solid fuel propelled rocket based braking apparatus of claim 1 where said oxidizer is ammonium nitrate.

8. The solid fuel propelled rocket based braking apparatus of claim 1 where said oxidizer is ammonium perchlorate.

9. The solid fuel propelled rocket based braking apparatus of claim 1 where said fuel material is magnesium.

10. The solid fuel propelled rocket based braking apparatus of claim 1 where said fuel material is aluminum.

11. The solid fuel propelled rocket based braking apparatus of claim 1 where said oxidizer further comprises a polymer binder.

12. The solid fuel propelled rocket based braking apparatus of claim 1 where said oxidizer further comprises a curing agent.

* * * * *